(12) United States Patent
Yura et al.

(10) Patent No.: US 9,645,418 B2
(45) Date of Patent: May 9, 2017

(54) METHOD AND APPARATUS FOR MANUFACTURING OPTICAL DISPLAY DEVICE

(71) Applicant: NITTO DENKO CORPORATION, Ibaraki-shi, Osaka (JP)

(72) Inventors: Tomokazu Yura, Ibaraki (JP); Akira Tawada, Ibaraki (JP); Satoru Koshio, Ibaraki (JP); Jun Mishima, Ibaraki (JP); Takuya Nakazono, Ibaraki (JP)

(73) Assignee: NITTO DENKO CORPORATION, Ibaraki-Shi, Osaka (JP)

( * ) Notice: Subject to any disclaimer, the term of this patent is extended or adjusted under 35 U.S.C. 154(b) by 60 days.

(21) Appl. No.: 14/434,750

(22) PCT Filed: Sep. 30, 2013

(86) PCT No.: PCT/JP2013/076470
§ 371 (c)(1),
(2) Date: Apr. 9, 2015

(87) PCT Pub. No.: WO2014/057827
PCT Pub. Date: Apr. 17, 2014

(65) Prior Publication Data
US 2015/0277162 A1    Oct. 1, 2015

(30) Foreign Application Priority Data

Oct. 10, 2012  (JP) .................................. 2012-224715
Sep. 25, 2013  (JP) .................................. 2013-198001

(51) Int. Cl.
*B32B 38/10*    (2006.01)
*G02F 1/13*    (2006.01)
(Continued)

(52) U.S. Cl.
CPC ............ *G02F 1/1303* (2013.01); *B29C 63/02* (2013.01); *B32B 38/10* (2013.01); *B65H 37/002* (2013.01);
(Continued)

(58) Field of Classification Search
CPC ....... B32B 37/12; B32B 37/14; B32B 37/187; B32B 41/00; B32B 2457/20;
(Continued)

(56) References Cited

U.S. PATENT DOCUMENTS

2010/0288420 A1*  11/2010  Kimura ............... B32B 38/1841
156/64
2012/0241077 A1*  9/2012  Hada .................... G02F 1/1303
156/64

FOREIGN PATENT DOCUMENTS

JP    2004-333647 A    11/2004
JP    2005-309371 A    11/2005
(Continued)

OTHER PUBLICATIONS

International Preliminary Report of Patentability issued Apr. 14, 2015 in connection with the counterpart International Patent Application No. PCT/JP2013/076470, citing the above reference(s).
(Continued)

*Primary Examiner* — George Koch
(74) *Attorney, Agent, or Firm* — Hauptman Ham, LLP

(57) ABSTRACT

A method for manufacturing an optical display device comprises: sequentially peeling a plurality of optical film sheets continuously supported via an adhesive layer on one of opposite surfaces of a carrier film, together with the adhesive layer from the carrier film under peeling action of the movable peeling member by winding a long web of the carrier film in a state where the other of opposite surfaces thereof being folded to inside at a tip-end of the movable
(Continued)

peeling member having the tip-end and passed around the peeling member; and laminating the plurality of optical film sheets to one of opposite surfaces of respective ones of panel components via the adhesive layer under laminating action of the closed lamination rollers.

22 Claims, 10 Drawing Sheets

(51) Int. Cl.
*B65H 37/00* (2006.01)
*G02F 1/1335* (2006.01)
*B29C 63/02* (2006.01)
*G02F 1/1333* (2006.01)

(52) U.S. Cl.
CPC ...... *G02F 1/1335* (2013.01); *G02F 1/133308* (2013.01); *B32B 2457/20* (2013.01); *B65H 2701/194* (2013.01); *G02F 2001/133322* (2013.01); *G02F 2001/133325* (2013.01); *G02F 2202/28* (2013.01)

(58) Field of Classification Search
CPC ........ B32B 2457/202; B32B 2457/204; B32B 2457/206; B32B 2457/208; B29C 63/0095; B29C 65/48; B29C 66/472; B29C 66/83413; G02F 1/1303; G02F 2202/28
USPC ......... 156/64, 252, 253, 351, 360, 361, 378, 156/379
See application file for complete search history.

(56) References Cited

FOREIGN PATENT DOCUMENTS

| | | |
|---|---|---|
| JP | 2009-186987 A | 8/2009 |
| JP | 4361103 B | 11/2009 |
| JP | 4377965 B1 | 12/2009 |
| JP | 2011-85629 A | 4/2011 |
| JP | 4728447 B1 | 7/2011 |
| JP | 2012-137695 A | 7/2012 |

OTHER PUBLICATIONS

International Search Report mailed Dec. 24, 2013 for PCT/JP2013/076470, citing the above reference(s).

* cited by examiner

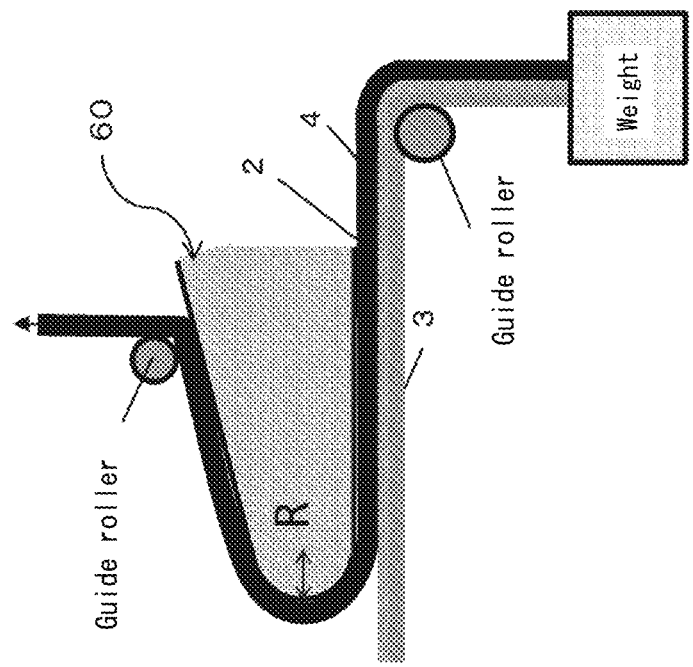
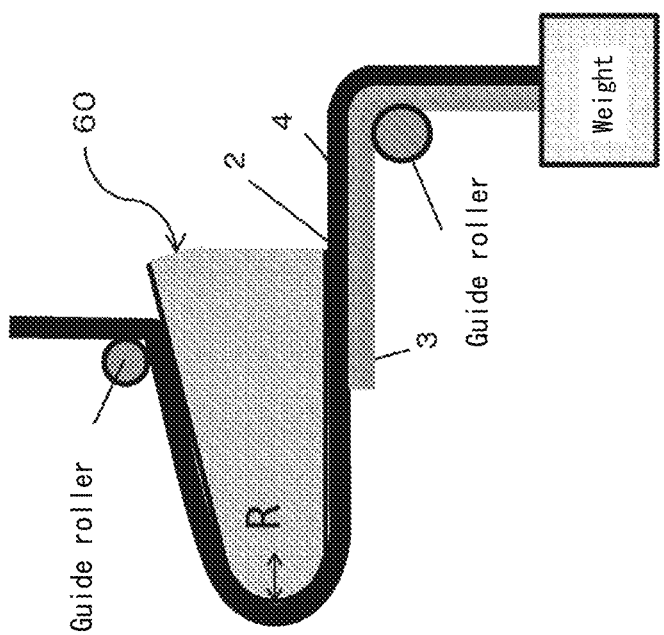
FIG. 8

FIG. 9

| Substrate | VEGQ1723NTB from Nitto Denko Corporation | CIG1484 CVAG350 from Nitto Denko Corporation | T-390 From Mitsubishi Plastics Inc |
|---|---|---|---|
| Thickness (μm) | 213 | 131 | 38 |
| Peeling rate (m/min) | 0.6 | 0.6 | 0.6 |
| R | | | |
| 25 | △× | | |
| 22.5 | ○ | | |
| 20 | | | |
| 17.5 | | | |
| 15 | | × | |
| 10 | | △× | |
| 7.5 | | ○ | |
| 6.5 | | ○ | |
| 5 | | | |
| 4 | | | × |
| 2 | | | △× |
| 1.5 | | | ○ |
| 1 | | | ○ |

○: Peelable
△×: Peelable but error occurred
×: Un-peelable

METHOD AND APPARATUS FOR MANUFACTURING OPTICAL DISPLAY DEVICE

CROSS REFERENCE TO RELATED APPLICATION

This application claims the priority of Japanese Patent Application No. 2012-224715, filed on Oct. 10, 2012, and Japanese Patent Application No. 2013-198001, filed on Sep. 25, 2013, in the JPO (Japan Patent Office). Further, this application is the National Phase application of International Application No. PCT/JP2013/076470 filed Sep. 30, 2013, which designates the United States and was published in Japanese.

TECHNICAL FIELD

The present invention relates to a method and an apparatus for manufacturing an optical display device, the method and the apparatus using lamination rollers configured to open/close in upward/downward direction with respect to feeding direction and a movable peeling member having a tip-end capable of going into/out of a space formed between the lamination rollers. In particular, the present invention relates to a method and an apparatus for manufacturing an optical display device, for sequentially peeling a plurality of optical film sheets continuously supported via an adhesive layer on one of opposite surfaces of a carrier film together with the adhesive layer from the carrier film under peeling action of the movable peeling member, by winding a long web of a carrier film in a state where the other of opposite surfaces thereof being folded to inside at the tip-end configuring a head portion of the movable peeling member and the carrier film being passed around the peeling member; and laminating the plurality of optical film sheets to one of opposite surfaces of respective ones of panel components via the adhesive layer under laminating action of the lamination rollers.

Patent Document 1 discloses a method and an apparatus using a peeling member having a tip-end for peeling an optical film sheet supported on a carrier film together with an adhesive layer from the carrier film by winding a long web of a carrier film which one of opposite surfaces thereof being folded to inside at the tip-end of the peeling member and laminating the plurality of optical film sheets to respective ones of panel components. Referring to FIG. 3 of Patent Document 1, there is shown a plurality of optical film sheets Xα, Xβ continuously supported via an adhesive layer 12 on one of opposite surfaces of a carrier film 13, and referring to FIG. 9 of Patent Document 1, there is shown a part of an apparatus for winding a carrier film 13 to peel a plurality of optical film sheets Xα together with an adhesive layer 12 from the carrier film 13 under peeling action of a peeling member 201 and laminating the plurality of optical film sheets Xα to respective ones of panel components W at a lamination station B where an edge detecting unit 190 for detecting a leading end of the optical film sheet Xα at a tip-end of the peeling member 201 and a laminating unit 200 including the lamination rollers are arranged.

Patent Document 2 also discloses a method and an apparatus using a peeling member having a tip-end for peeling an optical film sheet having an adhesive layer supported on a carrier film from the carrier film by winding a long web of a carrier film which one of opposite surfaces thereof being folded to inside at the tip-end of the peeling member and laminating the plurality of optical film sheets to respective ones of panel components. Referring to FIG. 5 and FIG. 6 of the Patent Document 2, there is shown a part of the apparatus for laminating a plurality of optical film sheets F to respective ones of panel components W by activating lamination rollers 25, 26, when a leading end of the optical film sheet F with an adhesive layer partially peeled from a carrier film S at a tip-end of a peeling member 14 is protruded from the tip-end of the peeling member 14 to establish so-called "head-out" state and a laminating position of the panel component W is overlapped to a part of the optical film sheet F.

Patent Document 3 discloses a method and an apparatus using a movable peeling member 150 having a tip-end, for winding a carrier film Z included in an optical film laminate (i.e., band-shaped film laminate) which one of opposite surface thereof being folded to inside at the tip-end of the movable peeling member to peel only normal sheets Xα out of normal sheets Xα and defective sheets Xβ, both of which being an optical film sheet with an adhesive layer supported on the carrier film Z, from the carrier film Z, and laminating the normal sheets Xα to panel components W. However, the movable peeling member 150 disclosed in the Patent Document 3 provides peeling action when it is advanced to a lamination station D, whereas it does not provide peeling action when it is retracted from the lamination D. Thus, as will be described later, the purpose and/or function of the movable peeling member completely differs from that of a movable peeling member used in the present invention.

Patent Document 4 discloses a method and an apparatus for detecting a position of an end of an optical film sheet (i.e., film piece) 5 with an adhesive surface formed on a carrier film (i.e., a releasing film) 6 included in an optical film laminate (i.e., a band-shaped film) 4 by a position detecting means 18, and correcting the position of the end of the optical film sheet 5 based on the detected positional information.

Recently, TV sets mostly utilize liquid-crystal display device. A liquid-crystal (LC) cell for a television has a size of 18 inches (450 mm) even for a small one, and the size exceeds 60 inches (1500 mm) for a large one. Thickness of such LC cell is 1.4 mm which is 3 times or more than that of a LC cell for a slate-PC, and weight is 300 to 3,500 g. On the other hand, smartphones and tablet terminals are universally distributed as high-performance portable terminals with built-in battery. Those portable terminals are referred as slate-PCs, and in many cases, a middle- or small-sized liquid-crystal display device is used as an optical display device. A Liquid-crystal display panel used for a middle- or small-sized liquid-crystal display device in general is configured to include a LC cell with a size of about 5 to 10 inches (120 to 250 mm), a color filter (CF) arranged on a viewing side of a LC cell, and a thin-film transistor (TFT) arranged on a non-viewing side thereof, and thickness of a LC cell is about 0.5 mm and weight thereof is about 15 to 40 g.

For a manufacturing system of middle- or small-sized liquid-crystal display devices used for slate-PCs, processing capacity that is not necessary for a manufacturing system of liquid-crystal display device for a television is required. For example, a process of laminating an optical film sheet comprising a polarizing film to both of opposite surfaces of a liquid-crystal display panel requires laminating accuracy and manufacturing speed of two times higher than those of a manufacturing system of liquid-crystal display device for a television. The manufacturing system further requires different functions from those required for a manufacturing system of liquid-crystal display devices for television, because, for example, processing of the middle- or small-sized liquid-crystal display devices may be easy or difficult in order to be light-weight, and contamination needs to be minimized in a clean room enclosing a whole manufacturing step by minimizing dead space and means and/or devices need to be capable of facilitating processing of an optical film laminate including a long-web of a carrier film to be used.

That is, in case of middle- or small-sized liquid-crystal display devices used in slate PCs, a liquid-crystal display panel LC used therefor is small and light as a size of the liquid-crystal display panel LC is about ⅓ to ⅕ and a weight thereof is less than 1/20 of those of a large liquid-crystal display device. A roll of an optical film laminate based on a long web of a carrier film supporting a plurality of optical film sheets to be laminated to respective one of liquid-crystal display panel LCs is also narrow in width and about ⅓ to 1/10 in weight. The roll is, for example, 500 mm in diameter, about 100 to 150 mm in width, and 30 to 70 kg in weight. Roll length of such an optical film laminate is about 900 m. However, manufacturing speed i.e., cycle time for such middle- or small-sized liquid-crystal display device is required to be two times higher than that for a large liquid-crystal display device, and laminating accuracy for an optical film sheet, such as a polarizing film supported on a carrier film, to be laminated to a liquid-crystal panel LC is also very severe.

A technical problem to be solved by the present invention is to achieve required laminating accuracy while maintaining cycle time required for laminating a panel component and an optical film sheet.

A liquid-crystal display panel to be used as a panel component for a liquid-crystal display device of a slate PC is typically configured with, but not limited to, a liquid-crystal cell (LC) having two glass substrates with a liquid-crystal layer L filled therebetween, and a size of about 5 to 10 inches (120 to 250 mm), a thickness of about 0.5 mm and a weight of 15 to 40 g. Cycle time per a panel component is limited to some extent, and allowable laminating accuracy during the cycle time is preferably about ±0.1 mm.

PRIOR ART DOCUMENTS

Patent Document 1: Japanese Patent No. 4377965B
Patent Document 2: Japanese Patent No. 4361103B
Patent Document 3: Japanese Patent No. 4728447B
Patent Document 4: Japanese Laid-Open Patent Application No. 2004-333647A

DISCLOSURE OF THE INVENTION

Problem to be Solved by the Invention

An aim of the present invention is to provide a method and an apparatus for manufacturing an optical display device with high laminating accuracy, as mentioned above.

In order to achieve required laminating accuracy in manufacturing an optical display device, it is necessary to sequentially peel a plurality of optical film sheets continuously supported on one of opposite surfaces of the carrier film together with an adhesive layer from the carrier film under a winding action for a long web of the carrier film which the other of opposite surfaces thereof is folded to inside by abutting at a tip-end of a peeling member while making a part of the optical film sheet protruded from the tip-end of the peeling member, and to precisely match a part of a separately conveyed panel component with the part of the optical film sheet establishing a head-out state at a predetermined laminating position. As envisaged from Patent Documents 1 and 2, in order to satisfy the above-mentioned requirements, first of all, a leading end of the optical film sheet establishing the head-out state should be precisely positioned at the predetermined laminating position. Next, a panel component should be conveyed so as to match a part of the panel component, for example a lamination-start position thereof, with the leading end of the optical film sheet. Consequently, the panel component and the optical film sheet are laminated such that the optical film sheet appropriately fits to one of the opposite surfaces of the panel component.

However, it is not necessarily easy to detect and check the leading end of the optical film sheet to be positioned at the predetermined laminating position, and, based on positional information of the leading end, to appropriately correct the leading end position, to control conveyance of the panel component, and to make the optical film sheet appropriately fit to the one of the opposite surfaces of the panel component. Because, in many cases, accuracy of the positional information of the leading end varies depending on a location for detecting the leading end of the optical film sheet, or how close the location for detecting may be to the leading end of the optical film sheet. In order to reduce lamination error due to what is described in the above, for example, it is necessary to position a leading end of an optical film sheet at a detecting position provided on a peeling member where such error hardly occurs. Further, since an optical film sheet establishing head-out state is prone to curl or droop at its leading end, it is necessary to bring the tip-end of the peeling member close to the predetermined laminating position so as to minimize a head-out length of the optical film sheet. However, there is a limit in arranging a position of a tip-end configuring a head portion of a fixed peeling member in close proximity to the predetermined laminating position due to positional relationship with a conveying channel of the panel component. According to the inventor's experience, cycle time per a panel component is limited to some extent, and achievable laminating accuracy during the cycle time may be about ±0.5 mm at best, thus laminating accuracy of about ±0.1 mm is hardly achievable.

In optical display devices, for example middle- or small-sized liquid-crystal display devices used for slate-PCs, a protrusion length, i.e., a head-out length of a leading end of an optical film sheet is preferably about 5 to 100 mm, and more preferably 5 to 50 mm from a tip-end of a peeling member. Therefore, in order to reduce lamination error, the leading end of the optical film sheet needs to be precisely positioned at a predetermined laminating position.

Means for Solving the Problem

The above-mentioned technical problem may be solved by the following operation steps in an apparatus for manufacturing an optical display device using lamination rollers configured to open/close in upward/downward direction with respect to feeding direction and a movable peeling member having a tip-end capable of going in/out of a space formed between the lamination rollers to laminate a plurality of optical film sheets to one of opposite surfaces of respective ones of panel components via an adhesive layer.

That is, the above-mentioned technical problem may be solved by the following operations. A tip-end configuring a head portion of the movable peeling member is moved to a space formed by opening the lamination rollers in upward/downward direction at a predetermined laminating position.

Then, unwinding or winding operation of a carrier film, in a state where one of opposite surfaces thereof is folded to inside at the tip-end of the movable peeling member and the carrier film is passed around the peeling member, is started, and a leading end of the optical film sheet supported on the carrier film is positioned at the predetermined laminating position in the space formed between the lamination rollers. Next, the leading end of the optical film sheet is read and the movable peeling member is retracted from the space formed between the lamination rollers interlockingly with winding operation of the carrier film based on the read positional information of the leading end, and a head-out state of the leading end of the optical film sheet is established, while the lamination rollers are closed in upward/downward direction to close the space, and laminating operation of the optical film sheet and a panel component separately conveyed to the predetermined laminating position is started. Finally, at the same time as starting the laminating operation, the carrier film is further wound for a winding amount corresponding to a length of the optical film sheet.

More particularly, a leading end of the optical film sheet is peeled together with the adhesive layer from the carrier film under peeling action of the movable peeling member while the leading end is retained at the predetermined laminating position, and when the panel component is separately conveyed to the leading end of the optical film sheet establishing a head-out state at the predetermined laminating position, the laminating operation of the lamination rollers is started to laminate the optical film sheet to one of opposite surfaces of respective one the panel component while further peeling the optical film sheet together with the adhesive layer to form the optical display device. In this case, the winding amount of the carrier film is preferably determined by considering lamination error caused by curling or drooping of the leading end of the optical film establishing the head-out state. Thus, the inventors have achieved a laminating accuracy of about ±0.1 mm while limiting a cycle time per a panel component to some extent.

Embodiments of the present invention are as follows.

A first embodiment of the present invention is a method for manufacturing an optical display device 6 by sequentially peeling a plurality of optical film sheets 3 together with an adhesive layer 4 from a carrier film 2, the optical film sheets being continuously supported via the adhesive layer 4 on one of opposite surfaces of a long web of the carrier film 2 which configures an optical film laminate; and laminating the plurality of optical film sheets 3 to one of opposite surfaces of respective ones of a plurality of panel components 5 via the adhesive layer 4 at a predetermined laminating position 100 by using a lamination rollers 50, 51 configured to open/close in upward/downward direction with respect to feeding direction and a movable peeling member 60 having a tip-end capable of going in/out of a space 400 formed between the lamination rollers 50, 51.

The method comprises a first step of switching the lamination rollers 50, 51 to non-active and opening the lamination rollers 50, 51 in upward/downward direction with respect to feeding direction after completing lamination of a preceding optical film sheet 3 to one of opposite surfaces of a preceding panel component 5 at the predetermined laminating position 100; and a second step of moving the movable peeling member 60 from a operation-start position 200 to a space 400 formed between the lamination rollers 50, 51, and of, when a tip-end 61 configuring a head portion of the movable peeling member 60 is stopped at least at the predetermined laminating position 100 or at a position exceeding therefrom, winding or unwinding the carrier film 2 in a state where the other of opposite surfaces thereof is folded to inside at the tip-end 61 and the carrier film is passed around the movable peeling member 60 to forwardly feed a leading end 31 of the optical film sheet 3 supported on the carrier film 2 to the predetermined laminating position 100.

The method further comprises a third step of operating a film leading end detecting means 70 to read the leading end 31 of the optical film sheet 3 when the leading end 31 of the optical film sheet 3 supported on the carrier film 2 is stopped at the predetermined laminating position 100; and a fourth step of forwardly feeding the panel component 5 to be laminated to the optical film sheet 3 from a predetermined waiting position 300 to the predetermined laminating position 100.

The method also comprises a fifth step of moving the movable peeling member 60 from the space 400 to the operation-start position 200 interlockingly with winding operation of the carrier film 2, to peel the leading end 31 of the optical film sheet 3 together with the adhesive layer 4 from the carrier film 2 while the leading end 31 is retained at the predetermined laminating position 100. More particularly, the fifth step is a step of peeling the leading end 31 of the optical film sheet 3 together with the adhesive layer 4 from the carrier film 2, while the leading end 31 is retained at the predetermined laminating position 100, under peeling action of the movable peeling member 60 being retracted to the operation-start position 200, and gradually protruding the leading end 31 from the tip-end 61 to establish a head-out state at the predetermined laminating position 100. A head-out length of the leading end 31 of the optical film sheet 3 establishing the head-out state is preferably about 5 to 100 mm and more preferably about 5 to 50 mm.

The method further comprises a sixth step of closing the space 400 formed between the lamination rollers 50, 51 and switching the lamination rollers 50, 51 to active when the panel component 5 reaches to the leading end 31 of the optical film sheet 3 at the predetermined laminating position 100, to start a laminating operation of the lamination rollers; and a seventh step of laminating the optical film sheet 3 and the panel component 5 via the adhesive layer 4 by further winding the carrier film 2 to further peel the optical film sheet 3 together with the adhesive layer 4 from the carrier film 2.

In the first embodiment, the leading end 31 of the optical film sheet 3 establishing a head-out state at the predetermined laminating position 100 and a lamination-start position 500 of the panel component 5 may be matched when the panel component 5 arrives at the leading end 31 of the optical film sheet 3.

In the first embodiment, the second step may be configured to move the movable peeling member 60 positioned at the operation-start position 200 to the predetermined laminating position 100 interlockingly with unwinding operation of the carrier film 2 in a state where the other of opposite surfaces thereof is folded to inside at the tip-end 61 and the carrier film is passed around the movable peeling member 60 while retaining the leading end 31 of the optical film sheet 3 at the movable peeling member 60, to stop the tip-end 61 at least at the predetermined laminating position 100 or at a position exceeding therefrom, and to forwardly feed the leading end 31 of the optical film sheet 3 to the predetermined laminating position 100.

In the first embodiment, the second step may also be configured to move only the movable peeling member 60 having the tip-end 61 positioned at the operation-start position 200 to the predetermined laminating position 100, to stop the tip-end 61 at the predetermined laminating position 100 or at a position exceeding therefrom, and then, to forwardly feed the leading end 31 of the optical film sheet 3 supported on a carrier film 2 to the predetermined laminating position 100 by winding the carrier film 2 in a state where the other of opposite surfaces thereof is folded to inside at the tip-end 61 and the carrier film is passed around the movable peeling member 60.

In the first embodiment, the third step may be configured to forwardly or backwardly feed the leading end 31 of the optical film sheet 3 supported on the carrier film 2 by winding or unwinding the carrier film 2 based on the positional information 310 of the leading end 31 read by the film leading end detecting means 70, and to further position the leading end 31 at the predetermined laminating position 100. More particularly, it is a step of forwardly or backwardly feeding the leading end 31 of the optical film sheet 3 when the leading end 31 of the optical film sheet 3 supported on the carrier film 2 does not arrive at the predetermined laminating position 100 or is at a position exceeding therefrom, and to correct deviation (δ) of the leading end 31 from the predetermined laminating position 100.

In the first embodiment, the third step may also be configured to operate the film leading end detecting means 70 to read the leading end 31 of the optical film sheet 3 supported on the carrier film 2 through a space 400 formed between the lamination rollers 50, 51.

In the first embodiment, the third step may further comprises a step of moving the film leading end detecting means 70 to a space 400 formed between the lamination rollers 50, 51 and operating the film leading end detecting means 70 to read the leading end 31 of the optical film sheet 3 supported on the carrier film 2; then, the fifth step may further comprises a step of retracting the film leading end detecting means 70 from the space 400, interlockingly with winding operation of the carrier film 2, to peel the leading end 31 of the optical film sheet 3 together with the adhesive layer 4 from the carrier film 2 while the leading end 31 of the optical film sheet 3 is retained at the predetermined laminating position 100.

In the first embodiment, the second, the fifth and the seventh steps are preferably configured to operate a carrier film feeding means 8 comprising forward/reverse feed rollers 80, 81 arranged at upstream and at downstream of the tip-end 61 of the movable peeling member 60 to wind or unwind the carrier film 2 without slacking.

In the first embodiment, the third step may be configured to read opposing edges 311, 312 of a leading end 31 of the optical film sheet 3 which is orthogonal to a feeding direction of the carrier film 2.

In the first embodiment, the film leading end detecting means 70 comprises a plurality of imaging devices 71, 72 having a measurement reference 700 specifying a position of each of the opposing edges 311, 312 of a leading end 31 of an optical film sheet 3, and the third step may further comprise a step of operating the imaging devices 71, 72 to specify the position of each of the opposing edges 311, 312 of the leading end 31 of the optical film sheet 3 based on the measurement reference 700.

In the first embodiment, the fourth step may further comprise a step of detecting the panel component 5 conveyed to the predetermined waiting position 300. More particularly, a panel component detecting means 91 arranged at the predetermined waiting position 300 may be operated to detect the panel component 5 at the predetermined waiting position 300.

In the first embodiment, the fourth step may further comprise a step of adjusting position and posture of the panel component 5 at the predetermined waiting position 300. More particularly, it is a step of operating a panel component position adjusting means 92 arranged at the predetermined waiting position 300 to pre-adjust at the predetermined waiting position 300 the position and posture of the panel component 5 conveyed to the predetermined laminating position 100 by a panel component conveying unit 90, i.e., a step of aligning the panel component 5.

A second embodiment of the present invention is an apparatus 10 for manufacturing an optical display device 6 by sequentially peeling a plurality of optical film sheets 3 together with an adhesive layer 4 from a carrier film 2, the optical film sheets being continuously supported via the adhesive layer 4 on one of opposite surfaces of a long web of the carrier film 2 which configures an optical film laminate; and laminating the plurality of optical film sheets 3 to one of opposite surfaces of respective ones of a plurality of panel components 5 via the adhesive layer 4 at a predetermined laminating position 100.

The apparatus 10 is configured with units as follows. The apparatus 10 comprises: lamination rollers 50, 51 configured to open/close in upward/downward direction with respect to feeding direction; and a movable peeling member 60 having a tip-end capable of going in/out of a space 400 formed between the lamination rollers 50, 51 and moving between an operation-start position 200 and a predetermined laminating position 100 in the space 400, and each of the above-mentioned components operates as follows. Firstly, the lamination rollers 50, 51 configured to open/close in upward/downward direction with respect to feeding direction are opened in upward/downward direction with respect to feeding direction and switched to non-active after completing lamination of a preceding optical film sheet 3 and a preceding panel component 5 at the predetermined laminating position 100, and then closed in upward/downward direction with respect to feeding direction and switched to active when next laminating operation of a panel component 5 and an optical film sheet 3 is started. Then, as the movable peeling member 60 having a tip-end is arranged to move between the operation-start position 200 and the space 400 formed between the lamination rollers 50, 51 by a peeling member moving unit 62, interlockingly with winding or unwinding operation of a carrier film 2, the movable peeling member 60 acts to peel the optical film sheet 3 together with an adhesive layer from the carrier film 2 by winding the carrier film 2 without slacking, interlockingly with movement of the movable peeling member 60, the carrier film 2 being in a state where the other of opposite surfaces thereof is folded to inside at the tip-end 61 configuring a head portion of the movable peeling member 60 and the carrier film is passed around the movable peeling member 60.

Further, the apparatus 10 comprises: a film leading end detecting unit 70 operating to read a leading end 31 of an optical film sheet 3 while the leading end 31 of the optical film sheet 3 supported on the carrier film 2 is retained at a position on a movable peeling member 60 corresponding to a predetermined laminating position 100, the movable peeling member 60 being moved to a space 400 between lamination rollers 50, 51; a carrier film feeding unit 8 operating to wind or unwind the carrier film 2 without slacking, the carrier film 2 being in a state where the other of opposite surfaces thereof is folded to inside at a tip-end 61 and the carrier film is passed around the movable peeling member 60; and a panel component conveying unit 90 operating to forwardly feed the panel component 5 to be laminated to the optical film sheet 3 at the predetermined laminating position 100, from a predetermined waiting position 300 to the predetermined laminating position 100.

The apparatus 10 further comprises a control means 800 for associating and operating each of the lamination rollers 50, 51 configured to open/close in upward/downward direction with respect to feeding direction, the peeling member moving unit 62 for moving the movable peeling member 60 having a tip-end 61 in/out of the space 400 formed between the lamination rollers 50, 51, the film leading end detecting unit 70, the carrier film feeding unit 8 and the panel component conveying unit 90, to laminate the optical film sheet 3 and the panel component 5 via the adhesive layer 4 at the predetermined laminating position 100 while further peeling the optical film sheet 3 together with the adhesive layer 4 from the carrier film 2, when the panel component 5 conveyed toward the predetermined laminating position 100 arrives at the leading end 31 of the optical film sheet 3 peeled together with the adhesive layer 4 from the carrier film 2.

In the second embodiment, the apparatus 10 may forwardly or backwardly feed the leading end 31 of the optical film sheet 3 supported on the carrier film 2 by winding or unwinding the carrier film 2 based on the positional information 310 of the leading end 31 of the optical film sheet 3 read by the film leading end detecting unit 70, and may further position the leading end 31 at the predetermined laminating position 100. More particularly, the apparatus 10 may forwardly or backwardly feed the leading end 31 of the optical film sheet 3, when the leading end 31 of the optical film sheet 3 supported on the carrier film 2 does not arrive at the predetermined laminating position 100 or is at a position exceeding therefrom, to correct deviation (δ) of the leading end 31 from the predetermined laminating position 100.

In the second embodiment, the apparatus 10 may be configured to operate the film leading end detecting unit 70 to read the leading end 31 of the optical film sheet 3 through the space 400 formed between the lamination rollers 50, 51 at the predetermined laminating position 100.

In the second embodiment, the apparatus 10 may further comprises a moving unit 73 with, for example, a built-in servo motor for moving the film leading end detecting unit 70 between a resting position and an operating position; the film leading end detecting unit 70 is moved to the space 400 formed between the lamination rollers 50, 51 by the moving unit 73, and the film leading end detecting unit 70 is operated to read the leading end 31 of the optical film sheet 3 and retracted from the space 400 after reading operation. Then, the apparatus 10 closes the lamination rollers 50, 51 and switches the lamination rollers 50, 51 to active, and starts the laminating operation of an optical film sheet 3 and a panel component 5.

In the second embodiment, the carrier film feeding unit 8 may comprise forward/reverse feed rollers 80, 81, each of which being arranged at least at upstream and at downstream of the tip-end 61 of the peeling member 60. In this case, the apparatus 10 comprises the carrier film feeding unit 8 configured with one of the forward/reverse roller 80, the peeling member 60, and the other of the forward/reverse feed roller 81, and a dancer roller 82 arranged between the one of the forward/reverse feed roller 80 and the peeling member 60, and the dance roller 82 may cooperate with the other of the forward/reverse feed roller 81 to wind or unwind the carrier film 2 without slacking.

In the second embodiment, the apparatus 10 comprises a film leading end detecting unit 70 comprising a plurality of imaging devices 71, 72 having a measurement reference 700 at a position corresponding to each of opposing edges 311, 312 of a leading end 31 of an optical film sheet 3 orthogonal to a feeding direction of a carrier film 2; and the imaging devices 71, 72 may be operated to read the opposing edges 311, 312 of the leading end 31 of the optical film sheet 3 to specify the positions of the opposing edges 311, 312 based on the measurement reference 700.

In the second embodiment, the apparatus 10 comprises a panel component detecting unit 91 at a predetermined waiting position 300 for detecting the panel component 5, and the control means 800 may operate the panel component detecting unit 91 to detect the panel component 5 conveyed to the predetermined waiting position 300.

In the second embodiment, the apparatus 10 comprises a panel component position adjusting unit 92 at the predetermined waiting position 300, and the control means 800 may operate the panel component position adjusting unit 92 to pre-adjust position and posture of the panel component 5 at the predetermined waiting position 300, which is conveyed to the predetermined laminating position 100 by the panel component conveying unit 90.

BRIEF DESCRIPTION OF THE DRAWINGS

FIG. 1 (*c*) is a schematic diagram illustrating positional relationship between a panel component and an optical film sheet in which a lamination-start position of the panel component is matched with a leading end of an optical film sheet.

FIG. 3 (*a*) is an enlarged view showing a position of the film leading end detecting unit reading the leading end of the optical film sheet at the movable peeling member moved to a space formed between the lamination rollers, and FIG. 3 (*b*) is an enlarged view showing a optical film sheet and a panel component immediately before being laminated, with the lamination rollers closed and switched to active.

FIG. 5 (f) illustrates an imaging screen reading opposing edges of a leading end of an optical film sheet.

FIG. 8 is a diagram representing an example of an experimental system for determining radius of curvature R of cross-sectionally arc-shaped surface of a peeling member based on a relative relationship between flexural reactive force of a substrate depending on a thickness of an experimental substrate which corresponds to an optical film sheet, and a peeling force of a carrier film against an adhesive layer of the substrate.

FIG. 9 is a table showing experiment results on samples of substrates with an adhesive layer, the substrate having a width of 50 mm and three different thickness.

BEST MODE FOR IMPLEMENTING THE INVENTION

Figure 2:
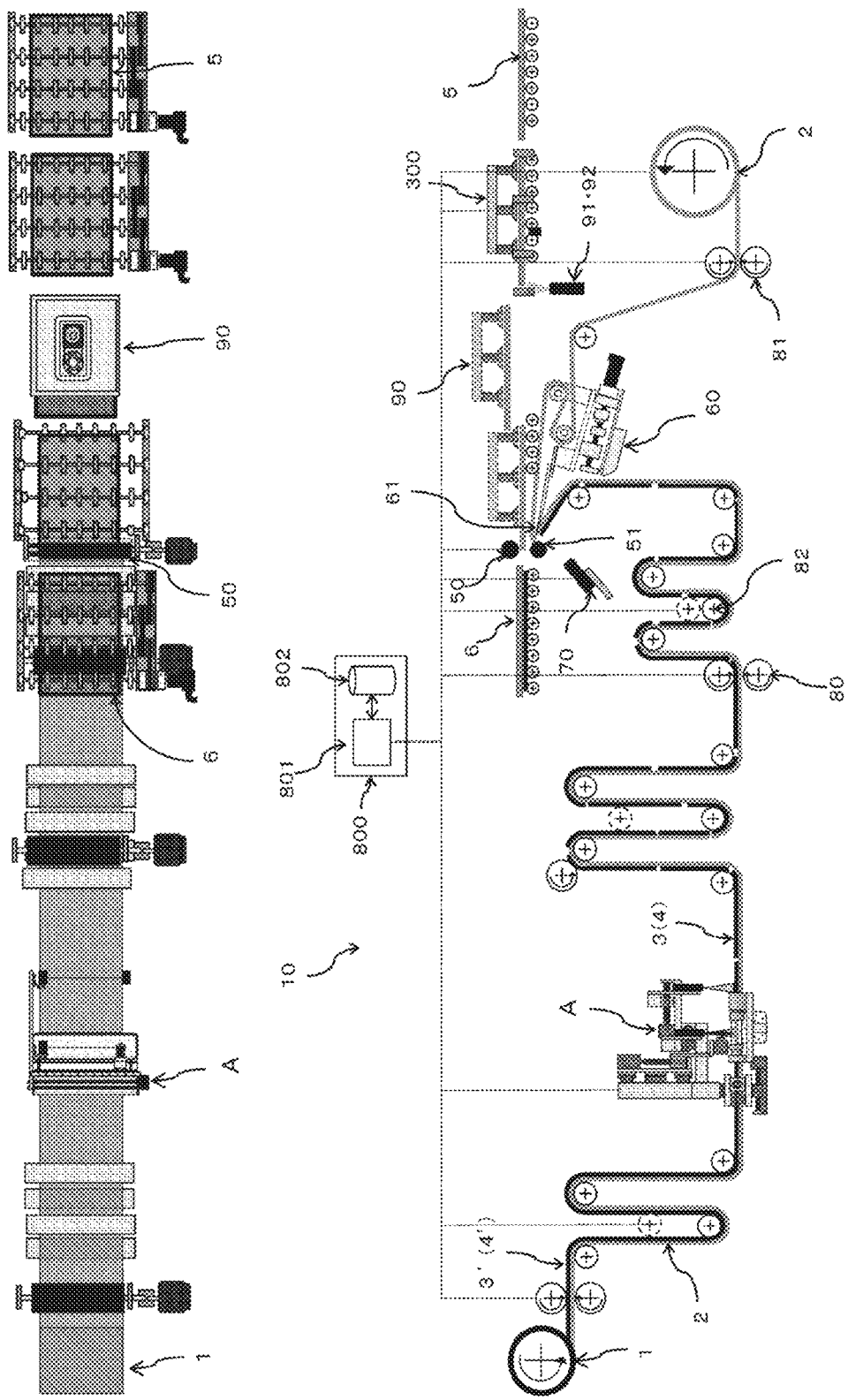
FIG. 2 illustrates a top view and a side view showing an entire apparatus used in an embodiment of the present invention for manufacturing an optical display device by laminating an optical film sheet to one of the opposite surfaces of a panel component via an adhesive layer by means of lamination rollers configured to open/close in upward/downward direction with respect to feeding direction at a predetermined laminating position and a movable peeling member having a tip-end capable of going in/out of a space formed between the lamination rollers.

Overview of a Method and an Apparatus for Manufacturing an Optical Display Device FIG. 2 illustrates a top view and a side view showing an entire apparatus 10 for manufacturing an optical display device 6 by laminating an optical film sheet 3 and a panel component 5 at a predetermined laminating position 100. The apparatus is provided with lamination rollers 50, 51 configured to open/close in upward/downward direction with respect to feeding direction at a predetermined laminating position 100, and a movable peeling member 60 capable of going in/out of a space 400 formed between the lamination rollers 50, 51 and movable between the space 400 and an operation-start position 200.

Figure 1:
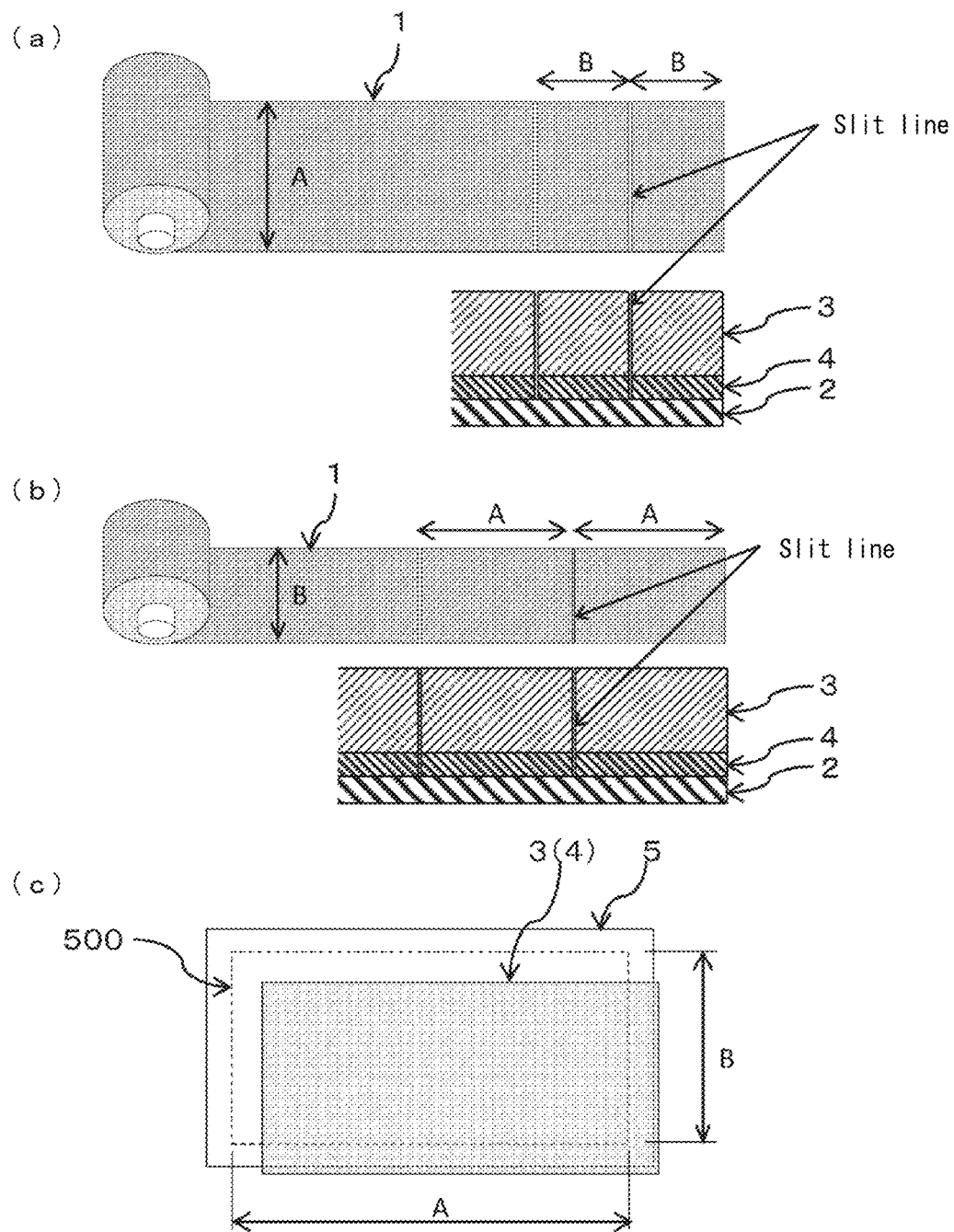
FIG. 1 illustrates top views and side views showing an example of an optical film laminate comprising a plurality of continuous optical film sheets together with an adhesive layer on a long web of a carrier film. Each of FIGS. 1 (*a*) and (*b*) shows an example of the optical film laminate on which a plurality of optical film sheets continuously supported by a long web of a carrier film having a width corresponding to a long side or a short side of a rectangular panel component, the optical film sheets formed by forming a plurality of slit lines on an optical film laminated together with an adhesive layer on one of opposite surfaces of the carrier film.
Figure 3:
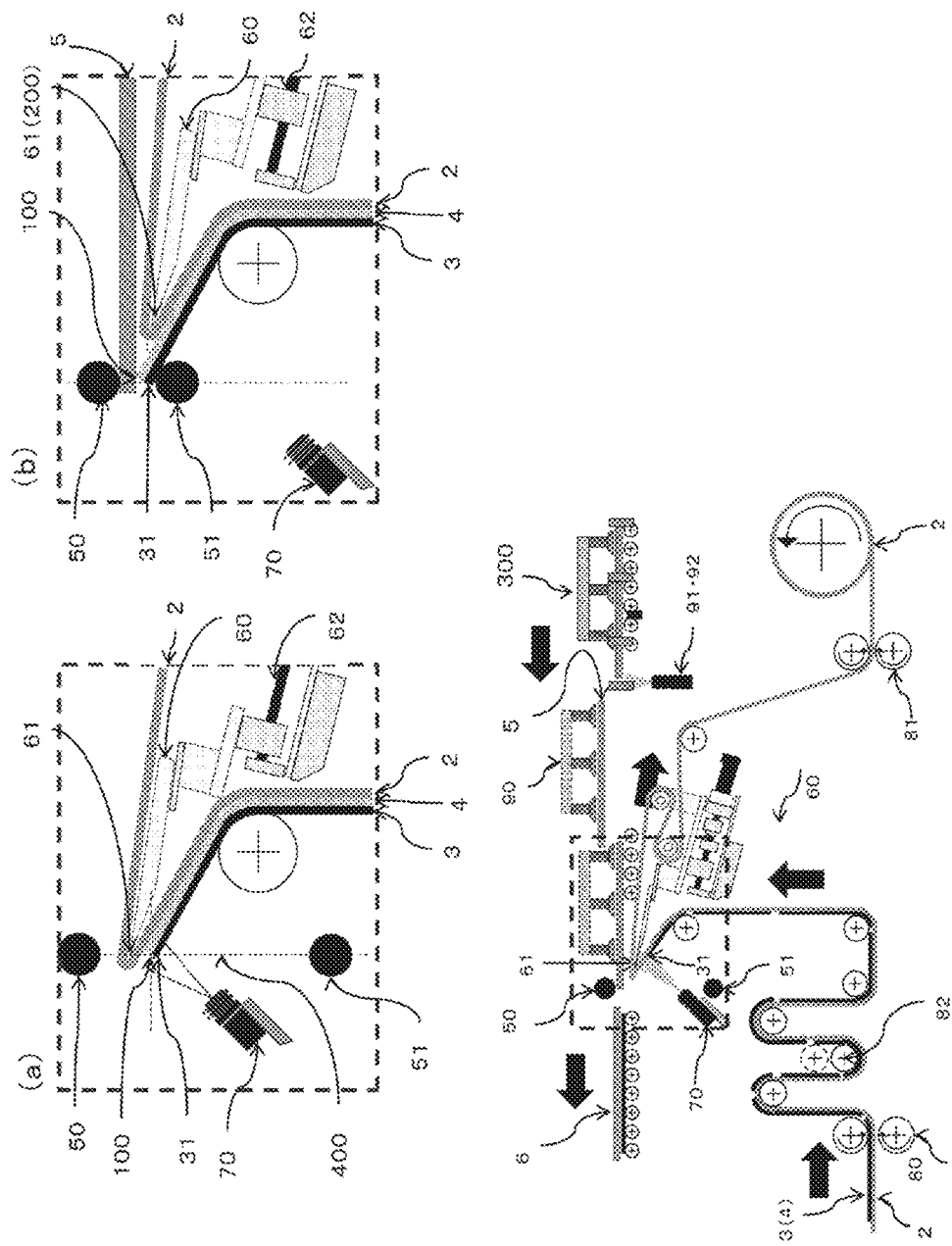
FIG. 3 illustrates enlarged side views of a movable peeling member and a film leading end detecting unit at a predetermined laminating position in FIG. 2.

As apparent from FIG. 3, a carrier film 2, in a state where one surface thereof is folded to inside at a tip-end 61 configuring a head portion of the movable peeling member 60 and the carrier film is passed around the movable peeling member 60, supports a leading end 31 of an optical film sheet 3 in a state being retained at the movable peeling member 60. Also, as shown in FIGS. 1 (a) and (b), the optical film sheet 3 including an adhesive layer 4 is formed by forming a plurality of slit lines on an optical film 3' laminated together with an adhesive layer 4' on one of opposite surfaces of a long web of a carrier film 2 which configures an optical film laminate 1 with a width corresponding to a long side or a short side of a rectangular panel component 5.

The apparatus 10 used in an embodiment of the present invention may be, for example but not limited to, an apparatus configuring a part of a manufacturing system of liquid-crystal display devices for slate-PCs. The manufacturing system has, but not limited to, a linear channel and dimension of the channel is assumed as about 210 to 550 mm in width and about 5000 to 6000 mm in length. Preferably, the linear channel is configured for a height where an operator can visually identify panel components 5 fed from a right end of the channel, a roll R of the optical film laminate 1 can be mounted at a left end of the channel, and the operator can visually identify a slitting unit A forming a plurality of slitting lines in the optical film 3' to continuously form a plurality of optical film sheets 3 with the adhesive layer 4 on one of opposite surfaces of a long web of the carrier film 2 which configures the optical film laminate 1. Such height may be from about 1000 to 1500 mm, and an overall height of the apparatus may be about 2500 mm. The slitting unit A may be omitted when using an optical film laminate 1 in which optical film sheets 3 with an adhesive layer 4 are preliminary formed on one of opposite surfaces of a long web of carrier film 2.

The apparatus 10 is arranged in a clean room as well-known to those skilled in the art. In a clean room, it is preferable that the manufacturing system is covered with a box-type housing with an operable door or window to maintain high-level cleanness in order to eliminate, as much as possible, adhesion of dirt etc. brought by workers and/or operators to the adhesive layer 4 of the optical film sheet 3 to be laminated to one or both surfaces of the panel component 5. From such view point, it is more preferable to arrange the channel in a hierarchical structure to prevent the panel components 5 passing over the optical film laminate 1 and further to locate the predetermined laminating position 100 to satisfy both of positional arrangements for feeding the optical film sheets 3 continuously supported on the carrier film 2 and for feeding of the panel components 5, to provide an optimal configuration which can be housed in the box-type housing in an arrangement allowing for exerting satisfying performance.

FIG. 3 illustrates schematic diagrams showing relationships between each of units which configure the apparatus 10 shown in FIG. 2, disposed at upstream or downstream of a predetermined laminating position 100 where lamination rollers 51 and 52 configured to open/close in upward/downward direction with respect to feeding direction are arranged. FIG. 3 shows a mechanism, i.e. a carrier film feeding mechanism, for winding or unwinding a long web of the carrier film 2 via a movable peeling member 60 having a tip-end 61, as will be described later. As will be described in detail later, the optical film sheets 3 are continuously supported together with the adhesive layer 4 on the carrier film 2 which is in a state where one surface thereof is folded to inside at a tip-end 61 configuring a head portion of the movable peeling member 60 and is passed around the movable peeling member 60.

FIG. 3 also shows a film leading end detecting unit 70 for reading a leading end 31 of the optical film sheet 3 supported on a carrier film 2 in a state where one surface thereof is folded to inside at the tip-end 61 and the carrier film is passed around the movable peeling member 60, while the leading end 31 of the optical film sheet 3 is retained at the movable peeling member 60 moved to a space 400 formed between the lamination rollers 50, 51, and a panel component conveying unit 90 for conveying the panel component 5 from a predetermined waiting position 300 to a predetermined laminating position 100.

FIG. 3 (*a*) is an enlarged view showing positional relationships between lamination rollers 50, 51 opened in upward/downward direction with respect to feeding direction, a movable peeling member 60 moved to a space 400 formed between the lamination rollers 50, 51, and a film leading end detecting unit 70 moved to the space 400 which is operated to read a leading end 31 of an optical film sheet 3 in a state being retained at the movable peeling member 60.

FIG. 3(*b*) is an enlarged view showing positional relationships between lamination rollers 50, 51 closed in upward/downward direction with respect to feeding direction, a movable peeling member 60 retracted to a operation-start position 200 when a panel component 5 reaches at a leading end 31 of an optical film sheet 3 which establishes a head-out state, and a film leading end detecting unit 70 retracted to a resting position, as well as a state of the optical film sheet 3 and the panel component 5 immediately before being laminated by the lamination rollers 50, 51 which are switched to active.

FIG. 1(*c*) is a schematic diagram showing a positional relationship between the optical film sheet 3 and the panel component 5 at the predetermined laminating position 100 where a lamination-start position 500 of the panel component 5 is matched to the leading end 31 of the optical film sheet 3 which established a head-out state from the tip-end 61, as will be described later. For example, firstly, an operation to accurately read the leading end 31 of the optical film sheet 3 should be surely performed in order to match, without any deviation, the leading end 31 of the optical film sheet 3 which establishes a head-out state of preferably 5 to 100 mm, more preferably 5 to 50 mm from the tip-end 61 of the peeling member 60 under peeling action of the tip-end 61 of the peeling member 60, with the lamination-start position 500 of the panel component 5 being conveyed. Then, winding amount of the carrier film 2, and timing and amount of conveying the panel component 5 should be controlled based on the read positional information 310 of the leading end 31.

Figure 4:
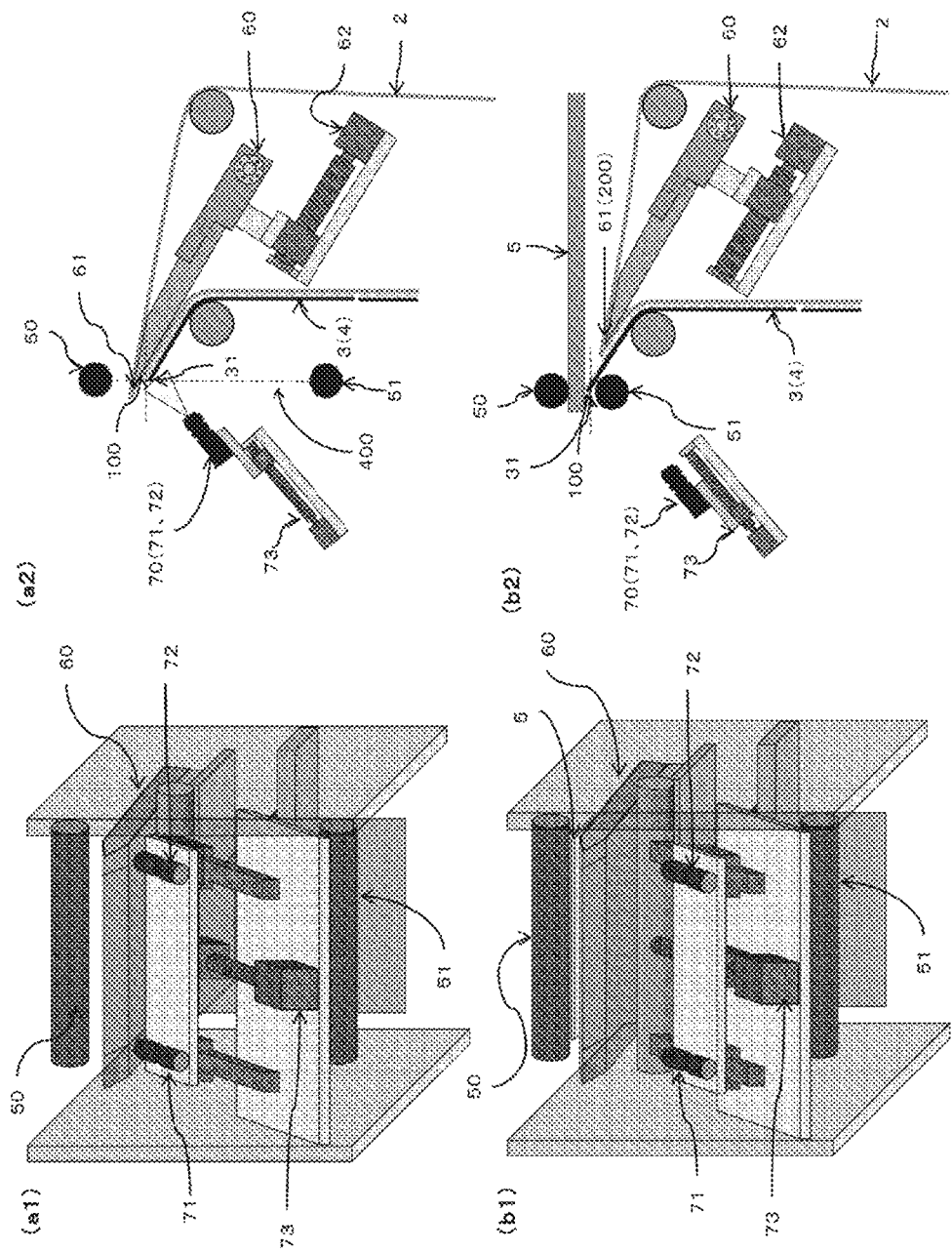
FIG. 4 illustrates perspective views (a1) and (b1) showing a film leading end detecting unit provided with two imaging units having measurement references arranged at positions corresponding to opposing edges of a leading end of an optical film sheet orthogonal to a feeding direction of a carrier film, and schematic diagrams (a2) and (b2) showing enlarged side views of positional relationship between a movable peeling member moved to a space formed between lamination rollers and a film leading end detecting unit reading opposing edges of a leading end of an optical film sheet, or positional relationship between a movable peeling member retracted from a space formed between lamination rollers and a film leading end detecting unit reading opposing edges of a leading end of an optical film sheet, at predetermined laminating positions corresponding to the perspective views (a1) and (b1).

FIG. 4 shows an embodiment of a film leading end detecting unit 70 for enabling what is described in the above. FIG. 4 (a1) and (a2) are a perspective view and a schematic side view showing a film leading end detecting unit 70 provided with two imaging units 71, 72 arranged for reading opposing edges 311, 312 of a leading end 31 of an optical film sheet 3 orthogonal to a feeding direction of a carrier film 2 passed around the movable peeling member 60 moved to a space 400 formed between lamination rollers 50, 51. Although not shown, the two imaging units 71, 72 have a measurement reference 700 arranged at a position corresponding to each of the opposing edges 311, 312 (see FIG. 5 (*f*)). As apparent from the schematic view, the film leading end detecting unit 70 operates at the space 400 formed between the lamination rollers 50, 51. The film leading end detecting unit 70 is moved to or retracted from the space 400 by a moving unit 73 with, for example, a built-in servo motor.

On the other hand, FIG. 4 (b1) and (b2) are a perspective view and a schematic side view showing a film leading end detecting unit 70 provided two imaging units 71, 72 which are retracted from the space 400, immediately before starting lamination of an optical film sheet 3 and a panel component 5 at a predetermined laminating position 100 by lamination rollers 50, 51 closed in upward/downward direction with respect to the feeding direction and switched to active. As apparent from the schematic view, the movable peeling member 60 is retracted to an operation-start position 200 by a peeling member-moving unit 62 in a state where a leading end 31 of a next optical film sheet 3 supported on a carrier film 2 is retained at the movable peeling member 60, and the film leading end detecting unit 70 is retracted from the space 400 to a resting position.

Figure 5:
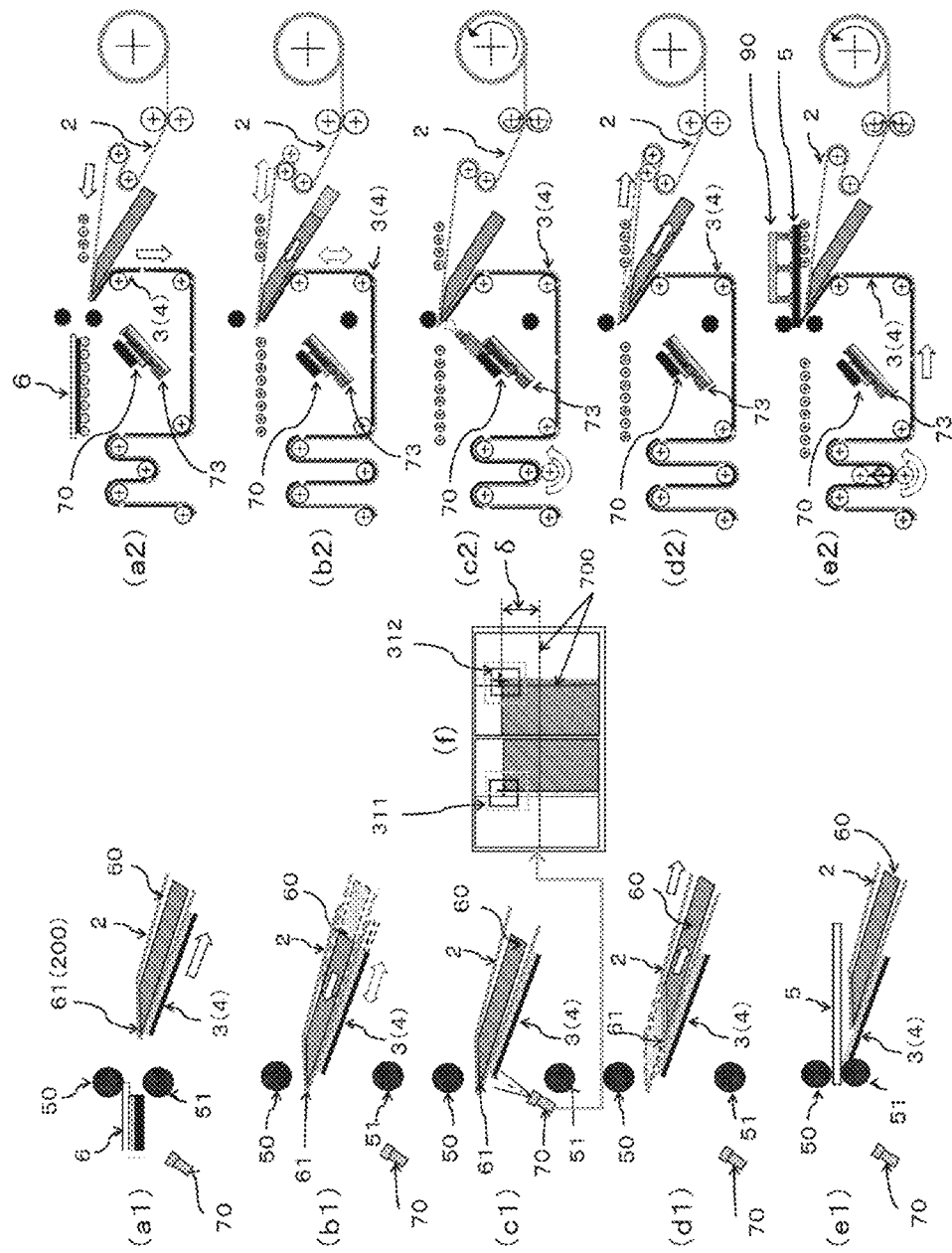
FIG. 5 illustrates schematic diagrams showing operation steps (a) to (e) of a leading end of an optical film sheet positioned on a movable peeling member at an operation-start position and on a movable peeling member moved to a predetermined laminating position shown in FIG. 3.

The method for manufacturing an optical display device 6 according to the present invention is characterized by operation steps (a) to (e) of the leading end 31 of the optical film sheet 3 on each of the movable peeling member 60 at a predetermined laminating position 100 and at an operation-start position 200, shown in FIG. 5. FIG. 5 includes schematic diagrams (a1) to (e1) enlarging operation steps (a) to (e) of the leading end 31 of the optical film sheet 3 at the predetermined laminating position 100, and schematic diagrams (a2) to (e2) showing winding or unwinding operations of the carrier film 2 corresponding to each of the operation steps (a) to (e).

The operation steps (a1) and (a2) represent a state immediately after lamination of a preceding optical film sheet 3 and a preceding panel component 5. As is clear, the lamination rollers 51, 52 closed in upward/downward direction and in active state grip a rear end portion of a preceding optical display device 6 immediately after the lamination. One the other hand, a carrier film 2 in a state where one surface thereof is folded to inside at the tip-end 61 is passed around the movable peeling member 60 retracted to the operation-start position 200 from the predetermined laminating position 100, and a next optical film sheet 3 to be laminated to a panel component 5 is supported on the carrier film 2 together with an adhesive layer 4 in a state being passed around the movable peeling member 60.

Although the leading end 31 of the optical film sheet 3 shown in the operation steps (a1) and (a2) is at the tip-end 61 of the movable peeling member 60, the leading end 31 is preferably positioned at upstream of the tip-end 61 of the movable peeling member 60 by unwinding operation of the carrier film 2 interlocked with retracting of the movable peeling member 60, as will be described in detail later. As apparent from schematic diagram (a2), the film leading end detecting unit 70 is retracted to a resting position by a moving unit 73, and the tip-end 61 configuring a head portion of the movable peeling member 60 is retracted to the operation-start position 200 by a peeling member moving unit 62 (see FIG. 4 (b2)). The carrier film 2 is in a state where it may be wound or unwound without slacking by interlocking and/or controlling a carrier film feeding unit 8 such as forward/reverse feed rollers 80, 81 and/or a dancer roller 82.

The operation steps (b1) and (b2) represent a state where the lamination rollers 50, 51 are switched to non-active and opened in upward/downward direction with respect to the feeding direction to form a space 400. They also represent a state where the movable peeling member 60 is moved by the peeling member moving unit 62 (see FIG. 4 (b2)), and the tip-end 61 configuring the head-portion of the movable peeling member 60 is moved to the space 400 and stopped at least at a predetermined laminating position 100 or a position exceeding therefrom. As apparent from the schematic diagram (b2), the carrier film 2 passed around the movable peeling member 60 is preferably once wound without slacking by back-feeding the carrier film 2 interlocked with moving the movable peeling member 60. It is for retaining the leading end 31 of the optical film sheet 3 supported on the carrier film 2 at the movable peeling member 60 without exceeding the tip-end 61.

In the operation steps (a1) and (a2), when a preceding optical film sheet 3 is peeled from the carrier film 2, i.e., after completing lamination of the optical film sheet 3 and a preceding panel component 5, a leading end 31 of a next optical film sheet 3 may possibly be positioned at a starting point of radius of curvature R of the tip-end 61 or positioned at a point exceeding the starting point of the radius of curvature R, i.e., peeled in a tangential direction of the radius of curvature R. This is because, as will be described in detail later, the tip-end 61 configuring a head portion of the movable peeling member 60 has a radius of curvature R, and when the tip end 61 arrives at a position corresponding to the back side of slit lines which form the plurality of the optical film sheets 3 supported on the carrier film 2 with the adhesive layer 4, the flexural reactive force of the optical film sheet 3 generated by the tip-end 61 with a radius of curvature R becomes greater than the peeling force Z of the carrier film 2 against the adhesive layer 4, and the optical film sheet 3 is gradually peeled from the leading end 31 together with the adhesive layer 4 in the tangential direction of R.

Such peeling state where a leading end 31 of an optical film sheet 3 protruding from the tip-end 61, unlike a head-out state of an optical film sheet 3 established at a predetermined laminating position 100, is never preferable, because the optical film sheet 3 may be dragged together with an adhesive layer over the tip-end 61 onto the opposite face of the movable peeling member 60. Such a state is preferably avoided by back-feeding the carrier film 2 without slacking which is passed around the movable peeling member 60, interlockingly with moving the movable peeling member 60.

Required laminating accuracy is achieved by the following steps to avoid such a state. The steps include: moving a movable peeling member 60 to a space 400 formed between lamination rollers 50, 51 while a leading end 31 of an optical film sheet 3 is supported on a carrier film 2 passed around the movable peeling member 60 and the leading end 31 is exceeding the tip-end 61; reading the leading end 31 of the optical film sheet 3 by a film leading end detecting unit; and surely positioning the leading end 31 at a predetermined laminating position 100 based on the read positional information of the leading end 31.

The operation steps (c1) and (c2) represent an operation of reading a leading end 31 of an optical film sheet 3 by a film leading end detecting unit 70 moved to the space 400 by a moving unit 73. A tip-end 61 configuring a head portion of the movable peeling member 60 is then moved to the space 400 by a peeling member moving unit 62 and stopped at least at a predetermined laminating position 100 or a position exceeding therefrom. The leading end 31 of the optical film sheet 3 supported on the carrier film 2 is retained at the movable peeling member 60 without exceeding the tip-end 61 thereof while the carrier film 2 is wound.

There are two selectable ways to forwardly move a leading end 31 of an optical film sheet 3 supported on a carrier film 2 to a space 400 formed between lamination rollers 50, 51. One of the ways is to operate a peeling member-moving unit 62 (see FIG. 4 (b2)) to move a movable peeling member 60 at an operation-start position 200 to the space 400 interlocked with winding or unwinding the carrier film 2, while the leading end 31 of the optical film sheet 3 supported on the carrier film 2 is retained at the movable peeling member 60 without exceeding the tip-end 61 thereof. The tip-end 61 of the movable peeling member 60 is then stopped at least at a predetermined laminating position 100 or a position exceeding therefrom. By this way, the leading end 31 of the optical film sheet 3 may be forwardly moved to the predetermined laminating position 100 or a position exceeding therefrom, while the leading end 31 is supported on the carrier film 2.

The other of the ways is to firstly move only the movable peeling member 60 at an operation-start position 200 to a space 400 formed between the lamination rollers 50, 51, not interlocked with winding or unwinding the carrier film 2. The tip-end 61 of the movable peeling member 60 is then stopped at least at a predetermined laminating position 100 or a position exceeding therefrom. Then, the leading end 31 of the optical film sheet 3 may be forwardly moved to the predetermined laminating position 100 or a position exceeding therefrom by winding the carrier film 2 which another surface thereof is folded to inside at the tip-end 61 and passed around the movable peeling member 60.

In either case, the leading end 31 of the optical film sheet 3 retained at the movable peeling member 60 without exceeding the tip-end 61 is then read within an imaging range shown in FIG. 5 (f). Further, a control unit 800 calculates a deviation (δ) between the leading end 31 and the predetermined laminating position 100 based on the read positional information of the leading end 31. When there is a deviation (δ) between the leading end 31 of the optical film sheet 3 and the predetermined laminating position 100 as shown in FIG. 5 (f), the position of the leading end 31 of the optical film sheet 3 is fine-adjusted by forwardly or backwardly moving the leading end 31 by winding or unwinding the carrier film 2, while the leading end 31 of the optical film sheet 3 is supported on the carrier film 2. Thus, the leading end 31 of the optical film sheet 3 may be further positioned to the predetermined laminating position 100.

As shown in the schematic diagram (d2), the movable peeling member 60 is retracted to the operation-start position 200 interlockingly with winding the carrier film 2. The operation steps (d1) and (d2) represent a leading end 31 of the optical film sheet 3 gradually establishing a head-out state, while the leading end 31 of the optical film sheet 3 supported on the carrier film 2 is peeled together with an adhesive layer 4 from the carrier film 2 under peeling action of the movable peeling member 60 as retracting to the operation-start position 200. In either case of forwardly moving the leading end 31 of the optical film sheet 3 to the space 400 in the operation steps (c1) and (c2), since the leading end 31 of the optical film sheet 3 is peeled together with the adhesive layer 4 from the carrier film 2 by interlocking retracting the movable peeling member 60 and winding the carrier film 2, difference of tension of the carrier film 2 between at upstream and at downstream of the tip-end 61 is hardly generated. By this, the leading end 31 of the optical film sheet 3 may smoothly establish a head-out state with a proper stroke while the leading end 31 is retained at the predetermined laminating position 100. A head-out length corresponds to a moving length of the tip-end 61 between the predetermined laminating position 100 and the operation-start position 200, and is preferably about 5 to 100 mm, and more preferably about 5 to 50 mm.

In the operation steps (d1) and (d2), the film leading end detecting unit 70 moved to the space 400 by the moving unit 73 is retracted from the space 400 to a resting position.

Next, operation steps (e1) and (e2) represent a laminating operation by the lamination rollers 50, 51 to laminate an optical film sheet 3 and a panel component 5 via an adhesive layer 4 at a predetermined laminating position 100 where the space 400 is closed. In the operation steps (e1) and (e2), the panel component 5 is conveyed to the predetermined laminating position 100 based on, but not limited to, the read positional information of the leading end 31 of the optical film sheet 3. Further, when a lamination-start position 500 of the conveyed panel component 5 is matched with the leading end 31 of the optical film sheet 3 establishing a head-out state at the predetermined lamination position 100 in the operation steps (e1) and (e2), the optical film sheet 3 and the panel component 5 are laminated via the adhesive layer 4 as the optical film sheet 3 is peeled together with the adhesive layer 4 from the carrier film 2 under peeling action of the movable peeling member 60 generated by further winding the carrier film 2.

Figure 6:
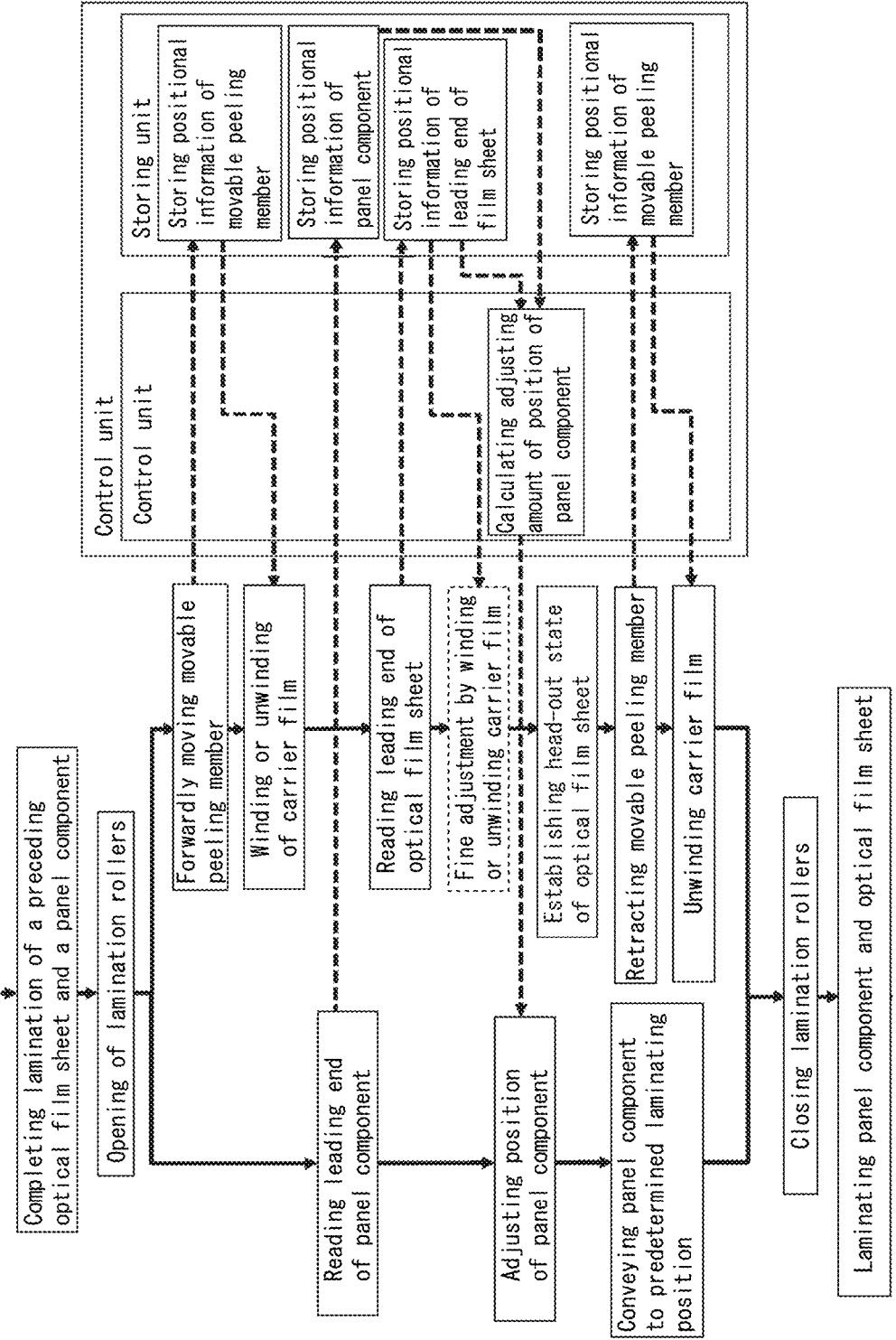
FIG. 6 illustrates a control flow chart representing a manufacturing process of an apparatus for manufacturing an optical display device shown in FIG. 2.
Figure 7:
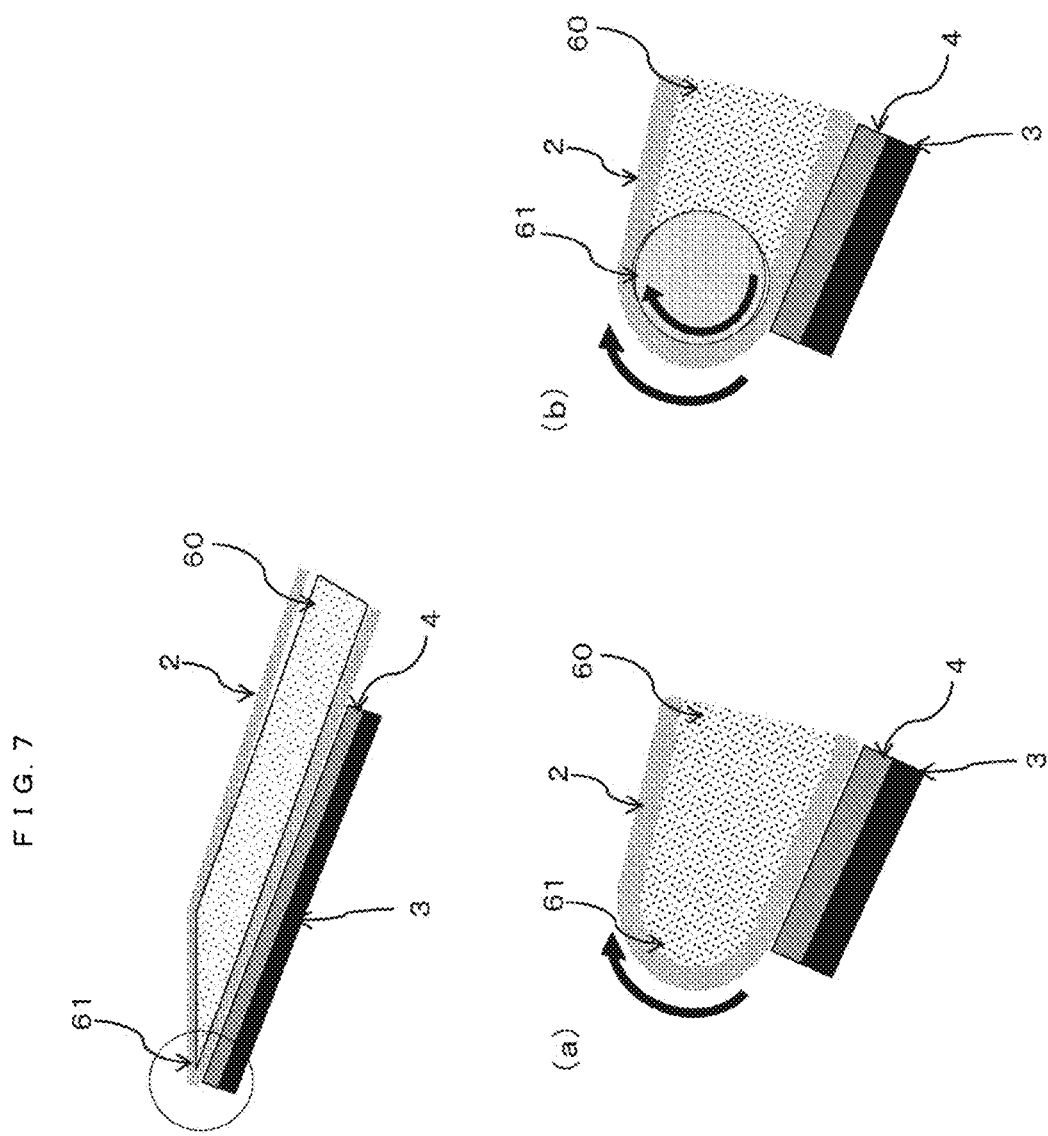
FIG. 7 Illustrates schematic diagrams showing radius of curvature R and a rotating structure of a tip-end configuring a head portion of a peeling member

To this end, as is clear from a flow chart shown in FIG. 6, a control unit 800 of the apparatus 10 associates and controls each of: an open/close operation and a laminating operation of the lamination rollers 51, 52; an operation of the movable peeling member 60 to move a space 400 or to retract from the space 400 to an operation-start position 200; an operation of the film leading end detecting unit 70 to read a leading end 31 of an optical film sheet 3 and/or an operation to move the film leading end detecting unit 70 to the space 400 or to retract it from the space 400 to a resting position; an operation of a carrier film feeding unit 8 to wind or unwind the carrier film 2; and an operation of a panel component conveying unit 90.

The flow chart in FIG. 6 is an example of a controlling method mainly showing details of controls by the control unit 800 performed from the operation steps (c1) and (c2) to read a leading end 31 of an optical film sheet 3 by a film leading end detecting unit 70 moved to a space 400 by a moving unit 73, to the operation steps (e1) and (e2) to convey a panel component 5 to the predetermined laminating position 100 and to match a lamination-start position 500 of the panel component 5 with the leading end 31 of the optical film sheet 3 establishing a head-out state at the predetermined laminating position 100. More particularly, according to the flow chart, after "completing lamination of a proceeding optical film sheet and a proceeding panel component", a space 400 is formed by "opening of lamination rollers" and "switching the lamination rollers to non-active" (not shown). Then, "winding or unwinding of the carrier film 2" is performed based on "stored positional information of the movable peeling member" by "forwardly moving the movable peeling member" to the space 400 with or without interlocking with moving the movable peeling member 60.

Next, a film leading end detecting unit 70 is operated to "read leading end of optical film sheet" and to check the leading end 31 of the optical film sheet 3 retained at the movable peeling member 60 as to whether or not the leading end 31 is at the predetermined laminating position 100 based on the "positional information of leading end of film sheet", and when there is a deviation (δ) between them, "fine adjustment by winding or unwinding the carrier film" is appropriately performed. After positioning the leading end 31 of the optical film sheet 3 at the predetermined laminating position 100, "establishing head-out state of the optical film sheet" is performed, and "conveying panel component to predetermined laminating position" is performed after "reading a leading end of a panel component" and "adjusting position of a panel component" of a panel to be conveyed is performed at a predetermined waiting position 300. Further, the space 400 is closed by "closing of the lamination rollers" and "switching the lamination rollers to active" (not shown). Finally, "laminating a panel component and an optical film sheet" is performed.

A radius of curvature R of a tip-end 61 configuring a head portion of a movable peeling member 60 may affect a peeling force of an optical film sheet 3, and may also generate difference of tension of a carrier film 2 folded at the tip-end 61 between at upstream and at downstream of the tip-end 61. Therefore, the R should be an optimal value so that the optical film sheet 3 is peeled together with an adhesive layer 4 from the starting point of the radius of curvature R to a tangential direction.

(Radius of Curvature R of a Tip-End Configuring a Head Portion of a Movable Peeling Member)

An optical film laminate 1 consists of a plurality of optical film sheets 3 continuously supported on one of opposite surfaces of a long web of a carrier film 2 via an adhesive layer 4. The plurality of the optical film sheets 3 continuously supported on the carrier film 2 are gradually peeled starting from the leading end 31 from the carrier film 2 together with the adhesive layer 4 under peeling action generated by the other surface, i.e., a rear surface of the carrier film 2 abutting to the tip-end configuring a head portion of the movable peeling member 60; in particular, as the tip end 61 arrives at a position corresponding to back side of the slit lines which form the plurality of the optical film sheets 3 supported on the carrier film 2 with the adhesive layer 4 by winding the optical film laminate 1 without slacking which is passed around the pealing member 60, the flexural reactive force of the optical film sheet 3 generated by the tip-end 61 having a radius of curvature R becomes greater than the peeling force Z of the carrier film 2 against the adhesive layer 4. What is described in the above is determined by the relative relationship between the radius of curvature R of the tip-end 61, a thickness X of the optical film sheet 3, and the peeling force Z of the carrier film 2 against the adhesive layer 4. In the following experimental system, the optical film sheet 3 is referred as "substrate."

The radius of curvature R of the tip-end 61 is determined based on the relative relationship between the thickness X of the substrate and the peeling force Z of the carrier film against the adhesive layer 4. One example of the relative relationship is described below. FIG. 8 shows an experimental system implemented.

As shown in the left diagram in FIG. 8, there is provided an optical film laminate 1 comprising a substrate 3 having an adhesive layer 4 with a longitudinal length shorter than a carrier film 2 and releasably laminated to the carrier film 2, a rear surface of the carrier film 2 is abutted against a tip-end 61 having a radius of curvature R and acting as a peeling point, the optical film laminate 1 is passed around the tip-end 61 of a movable peeling member 60 such that a border between a portion where the carrier film 2 and the substrate 3 having the adhesive layer 4 are laminated and a portion with only the carrier film 2 is positioned at upstream of the tip end 61 of the movable peeling member 60, the tip end 61 with the radius of curvature R of the movable peeing member 60, and an end of the portion with only the carrier film 2 to which the tip-end 61 abuts to the rear surface thereof is folded by a guide roller and upwardly pulled at a constant rate.

Thus, as shown in the right diagram in FIG. 8, when the border between the portion where the carrier film 2 and the substrate 3 having the adhesive layer 4 are laminated and the portion with only the carrier film 2 arrives at the tip-end 61 with the radius of curvature R of the movable peeing member 60, the substrate may or may not be peeled depending on the relationship between the flexural reactive force of the substrate 3 and the peeling force of the carrier film 2 against the adhesive layer 4, i.e., depending on a size of R.

It is tested as to whether or not the substrate 3 may be peeled at the peeling point by varying the radius of curvature R of the tip-end 61.

Reference is now made to FIG. 9. Whether or not the substrate 3 is peelable is determined by classifying the tested substrates to one completely peeled, one incompletely peeled as the substrate 3 having the peeled adhesive layer 4 was dragged obliquely upward by the carrier film 2, and one not peeled. FIG. 9 shows the test results. The three substrates used in the test were VEGQ 1723 NTB (thickness: 213 μm), CIG 1484 CVAG 350 (thickness: 131 μm) of Nitto Denko Corporation, and PET T-390 (thickness: 38 μm) of Mitsubishi Plastics Inc., considering difference in rigidity (thickness), and each sample had a width of 50 mm. The thickness X is a value of an optical film sheet which an adhesive layer 4 is not formed thereon. Although flexural rigidity is calculated from elastic modulus of the substrate 3, films for use in liquid-crystal display elements are generally made of synthetic resin, and there is not a significant difference in elastic modulus of the films. Therefore, degree of flexural rigidity is generally determined by the thickness of the substrate.

In the test, a weight of 1 kg/50 mm was mounted to a lower end of the optical film laminate 1 in order to apply tension, as shown in FIG. 8. A 180-degree peeling force of the carrier film 2 against the adhesive layer 4 was in a range of 0.05 to 0.15[N/50 mm]. In the test, conveying speed was 0.6[m/min]. Values of R[mm] at which peeling was failed are plotted for the thicknesses X of the substrate 3 in a range of 1 to 25 mm.

As is clear from FIG. 9, the substrate 3 with a thickness of 213 μm was completely peeled when the radius of curvature R was or less than 22.5 mm, but it was not peeled or incompletely peeled when the radius of curvature R was 25.0 mm. The substrate 3 with a thickness of 131 μm was completely peeled when the radius of curvature R was or less than 7.5 mm, but it was not peeled or incompletely peeled when the radius of curvature R was 10.0 mm. The substrate 3 with a thickness of 38 μm was completely peeled when the radius of curvature R was or less than 1.5 mm, but it was not peeled or incompletely peeled when the radius of curvature R was 2.0 mm.

Figure 10:
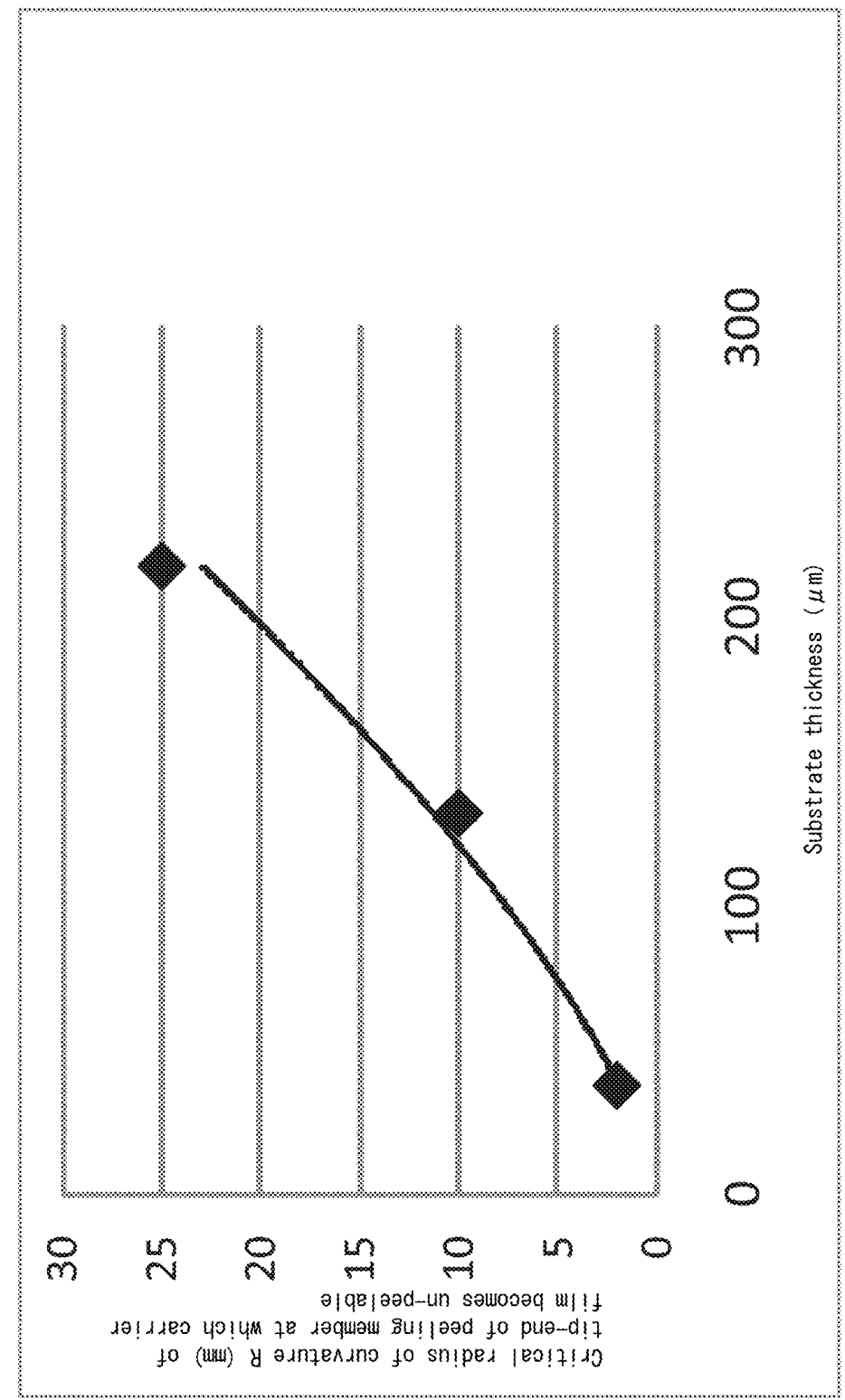
FIG. 10 is a graph plotting a relationship between a thickness of a substrate with an adhesive layer and a critical R incapable of causing peeling based on the result shown in FIG. 9.

FIG. 10 shows the relationship between a thickness X of the substrate 3 and critical R at which the substrate 3 is not peeled. Specifically, the substrate 3 having an adhesive layer 4 may not be peeled when it is in a region above the line in FIG. 10. On the other hand, the substrate 3 having an adhesive layer 4 may be peeled if it is in a region below the line. In other words, this line is a threshold as to whether the substrate may or may not be peeled.

Although the present invention has been described for preferable embodiments, those skilled in the art may understand that various modifications may be made and elements may be replaced with equivalents without departing from the scope of the present invention. Therefore, the present invention should not be limited to specific embodiments disclosed as the best mode of embodiments considered for implementing the present invention, and it is intended that the present invention encompasses all embodiments which belong to claims.

EXPLANATION OF NUMERICAL CHARACTERS

1: Optical film laminate
2: Carrier film
3': Optical film
3: Optical film sheet
31: Leading end of optical film sheet
310: Positional information of leading end
311, 312: Opposing edges of leading end face of optical film sheet
4': Adhesive layer included in optical film
4: Adhesive layer included in optical film sheet
5: Panel component
500: Lamination-start position of panel component
6: Optical display device
10: Apparatus for manufacturing optical display device
51, 52: Lamination rollers configured to open/close in upward/downward direction with respect to feeding direction
60: Movable peeling member
61: Tip-end configuring a head portion of movable peeling member
62: Peeling member moving unit
70: Film leading end detecting unit
71, 72: Imaging unit
73: Moving unit
8: Carrier film feeding unit
80, 81: Forward/reverse feed rollers
82: Dancer roller
100: Predetermined laminating position
200: Operation-start position of movable peeling member
300: Predetermined waiting position of panel component
400: Space formed by opening lamination rollers in upward/downward direction
800: Control unit
A: Slitting unit

The invention claimed is:

1. A method for manufacturing an optical display device by sequentially peeling a plurality of optical film sheets together with an adhesive layer from a carrier film, the optical film sheets being continuously supported via the adhesive layer on one of opposite surfaces of a long web of the carrier film which configures an optical film laminate, and laminating the plurality of optical film sheets to one of opposite surfaces of respective ones of a plurality of panel components via the adhesive layer by using lamination rollers configured to open/close and a movable peeling member having a tip-end capable of going in/out of a space formed between the lamination rollers:

a first step of switching the lamination rollers to non-active and opening the lamination rollers after completing lamination of a preceding optical film sheet to one of opposite surfaces of a preceding panel component at the predetermined laminating position;

a second step of moving the movable peeling member from an operation-start position to a space formed between the lamination rollers, stopping a tip-end configuring a head portion of the movable peeling member at least at a predetermined laminating position or at a position exceeding therefrom, and winding or unwinding the carrier film in a state where one surface thereof folded to inside at the tip-end and passed around the movable peeling member, for forwardly feeding a leading end of the optical film sheet supported on the carrier film to the predetermined laminating position;

a third step of operating a film leading end detecting means to read the leading end of the optical film sheet when the leading end of the optical film sheet supported on the carrier film is stopped at the predetermined laminating position;

a fourth step of forwardly feeding the panel component to be laminated to the optical film sheet from a predetermined waiting position to the predetermined laminating position; and a fifth step of moving the movable peeling member from the space to the operation-start position interlockingly with winding the carrier film, and peeling the leading end of the optical film sheet together with the adhesive layer from the carrier film while the leading end of the optical film sheet being retained at the predetermined laminating position;

a sixth step of closing the space formed between the lamination rollers and switching the lamination rollers to active when the panel component reaches to the predetermined laminating position where the leading end of the optical film sheet is retained, and starting a laminating operation of the lamination rollers;

a seventh step of laminating the optical film sheet and the panel component via the adhesive layer while further peeling the optical film sheet together with the adhesive layer from the carrier film by further winding the carrier film.

2. The method according to claim 1, wherein the leading end of the optical film sheet establishing a head-out state at the predetermined laminating position and a lamination-start position of the panel component are matched when the panel component and the leading end of the optical film sheet arrive at the predetermined laminating position.

3. The method according to claim 1, wherein the second step is configured to move the movable peeling member at the operation-start position to the predetermined laminating position, interlockingly with unwinding the carrier film in a state where the other of opposite surfaces thereof is folded to inside at the tip-end and is passed around the movable peeling member, and to stop the tip-end at least at the predetermined laminating position or at a position exceeding therefrom, so as to forwardly feed the leading end of the optical film sheet to the predetermined laminating position.

4. The method according to claim 1, wherein the second step is configured to move only the movable peeling member at the operation-start position to the predetermined laminating position, to stop the tip-end at the predetermined laminating position or at a position exceeding therefrom, and then to feed the leading end of the optical film sheet to the predetermined laminating position by winding the carrier film in a state where the other of opposite surfaces thereof is folded to inside at the tip-end and passed around the movable peeling member.

5. The method according to claim 1, wherein the third step is configured to forwardly or backwardly feed the leading end of the optical film sheet by winding or unwinding the carrier film based on the positional information of the leading end of the optical film sheet read by the film leading end detecting means, so as to further position the leading end at the leading end detecting position.

6. The method according to claim 1, wherein the third step is configured to operate the film leading end detecting means to read the leading end of the optical film sheet through a space formed between the lamination rollers.

7. The method according to claim 1, wherein the third step is configured to move the film leading end detecting means to a space formed between the lamination rollers and operate the film leading end detecting means to read the leading end of the optical film sheet; and the fifth step is configured to peel the leading end of the optical film sheet together with the adhesive layer from the carrier film while the leading end being retained at the predetermined laminating position, after retracting the film leading end detecting means from the space.

8. The method according to claim 1, wherein the second, the fifth and the seventh steps are configured to operate a carrier film feeding means comprising forward/reverse feed rollers arranged at upstream and at downstream of the tip-end of the movable peeling member to wind or unwind the carrier film without slacking.

9. The method according to claim 1, wherein the third step is configured to read opposing edges of a leading end face of the optical film sheet which are orthogonal to a feeding direction of the carrier film.

10. The method according to claim 1, wherein the film leading end detecting means comprises a plurality of imaging devices having a measurement reference specifying a position of each of opposing edges of the leading end face of the optical film sheet, and the third step is configured to operate the imaging devices to specify the positions of the opposing edges based on the measurement reference.

11. The method according to claim 1, wherein the fourth step further comprises a step of detecting the panel component conveyed to the predetermined waiting position.

12. The method according to claim 1, wherein the fourth step further comprises a step of pre-adjusting position and posture of the panel component at the predetermined waiting position which is conveyed to the predetermined laminating position.

13. An apparatus for manufacturing an optical display device by sequentially peeling a plurality of optical film sheets together with an adhesive layer from a carrier film, the optical film sheets being continuously supported via the adhesive layer on one of opposite surfaces of a long web of the carrier film which configures an optical film laminate, and laminating the plurality of optical film sheets to one of opposite surfaces of respective ones of a plurality of panel components via the adhesive layer at a predetermined laminating position, the apparatus comprising:

lamination rollers configured to open/close which are opened and switched to non-active after completing lamination of a preceding optical film sheet and a preceding panel component at the predetermined laminating position, and closed and switched to active when next laminating operation of a panel component and an optical film sheet is started;

a movable peeling member comprising a head portion where one surface of the carrier film is folded to inside and a body where the carrier film is passed therearound, and having a tip-end moving between a space formed between the lamination rollers and a operation-start position;

a peeling member moving unit operated to move the movable peeling member between the operation-start position and the space interlockingly with winding or unwinding the carrier film without slacking;

a film leading end detecting unit operated to read a leading end of the optical film sheet in a state where the leading end of the optical film sheet supported on the carrier film is stopped at a position on the movable peeling member corresponding to the predetermined laminating position;

a carrier film feeding unit operated interlockingly with winding or unwinding of the carrier film without slacking, the carrier film being in a state where the other of opposite surfaces thereof is folded to inside at the tip-end and passed around the movable peeling member;

a panel component conveying unit operated to forwardly feed the panel component to be laminated to the optical film sheet at the predetermined laminating position, from a predetermined waiting position to the predetermined laminating position; and a control means for associating and operating each of the lamination rollers, the peeling member moving unit for moving the tip-end of the movable peeling member in/out of the space formed between the lamination rollers, the film leading end detecting unit, the carrier film feeding unit and the panel component conveying unit, to gradually peel the optical film sheet together with the adhesive layer from the carrier film which is passed around the movable peeling member at the predetermined laminating position by winding the carrier film without slacking interlockingly with retracting the movable peeling member from the space, and to laminate the optical film sheet and the panel component via the adhesive layer while further peeling the optical film sheet together with the adhesive layer from the carrier film when the panel component conveyed to the predetermined laminating position arrives at the peeled leading end of the optical film sheet.

14. The apparatus according to claim 13, wherein the control means is configured to match a leading end of the optical film sheet establishing a head-out state and a lamination-start position of the panel component when the panel component and the leading end of the optical film sheet arrive at the predetermined laminating position.

15. The apparatus according to claim 13, wherein the apparatus is configured to operate the carrier film feeding unit based on the positional information of the leading end of the optical film sheet read by the film leading end detecting unit to forwardly or backwardly feed the optical film sheet by winding or unwinding the carrier film without stacking, so as to further position the leading end of the carrier film supported on the carrier film at the predetermined laminating position.

16. The apparatus according to claim 13, wherein the apparatus is configured to operate the film leading end detecting unit to read the leading end of the optical film sheet through a space formed between the lamination rollers.

17. The apparatus according to claim 13, wherein the apparatus is configured to move the film leading end detecting unit to a space formed between the lamination rollers and to operate the film leading end detecting unit to read the leading end of the optical film sheet, and to retract the film leading end detecting unit from the space after reading the leading end of the optical film sheet.

18. The apparatus according to claim 13, wherein the carrier film feeding unit comprises forward/reverse feed rollers arranged at least at upstream and at downstream of the tip-end of the peeling member.

19. The apparatus according to claim 18, wherein the carrier film feeding unit is configured with one forward/reverse roller, the peeling member, and another forward/reverse feed roller, and a dancer roller is arranged between the one forward/reverse feed roller and the peeling member and is cooperated with the another forward/reverse feed roller to wind or unwind the carrier film without slacking.

20. The apparatus according to claim 13, wherein the film leading end detecting unit comprises a plurality of imaging devices having a measurement reference positioned in proximity to a position corresponding to each of opposing edges of a leading end face of the optical film sheet orthogonal to a feeding direction thereof, and the imaging devices are operated to read the opposing edges of the leading end face of the optical film sheet to specify the positions of the opposing edges based on the measurement reference.

21. The apparatus according to claim 13, wherein a panel component detecting unit for detecting the panel component is arranged at the predetermined waiting position, and the control means operates the panel component detecting unit to detect the panel component conveyed to the predetermined waiting position.

22. The apparatus according to claim 13, wherein a panel component position adjusting unit is arranged at the predetermined waiting position, and the control means operates the panel component position adjusting unit to pre-adjust position and posture of the panel component conveyed to the predetermined laminating position by the panel component conveying unit at the predetermined waiting position.

* * * * *